M. NIRDLINGER.
DRINKING VESSEL.
APPLICATION FILED FEB. 3, 1915.

1,168,027.

Patented Jan. 11, 1916.

Witnesses
J. M. Geoghegan
W. G. Cooke

Inventor
Max Nirdlinger
By J. W. Cooke,
Attorney.

UNITED STATES PATENT OFFICE.

MAX NIRDLINGER, OF PITTSBURGH, PENNSYLVANIA.

DRINKING VESSEL.

1,168,027.  Specification of Letters Patent.  Patented Jan. 11, 1916.

Application filed February 3, 1915. Serial No. 5,869.

*To all whom it may concern:*

Be it known that I, MAX NIRDLINGER, a citizen of the United States, and a resident of Pittsburgh, in the county of Allegheny and State of Pennsylvania, have invented a new and useful Improvement in Drinking Vessels; and I do hereby declare the following to be a full, clear, and exact description thereof.

My invention relates to drinking vessels or glasses, and has for its object such a vessel or glass which will be simple and convenient in its form and use for drinking purposes, and will eliminate methods and devices ordinarily used in households and other places where the vessel or glass is used.

To these ends my invention consists, generally stated, in the novel form of drinking vessel or glass, as hereinafter more specifically set forth and described and particularly pointed out in the claims.

To enable others skilled in the art to which my invention appertains to construct and use my improved drinking vessel or glass, I will describe the same more fully, referring to the accompanying drawing, in which—

Figure 1:
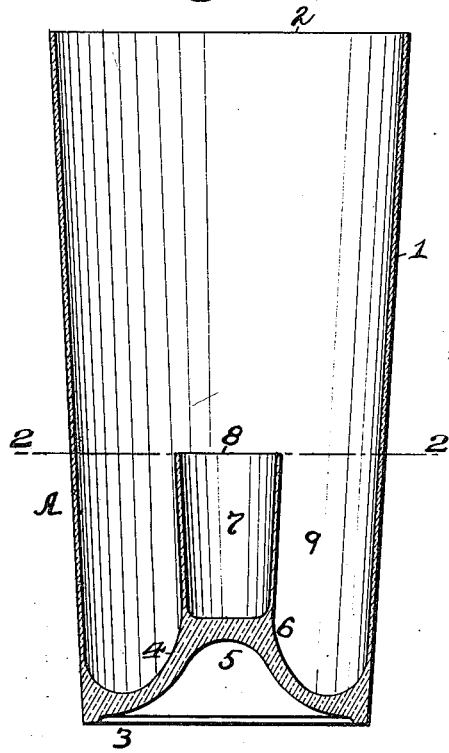
Figure 3:
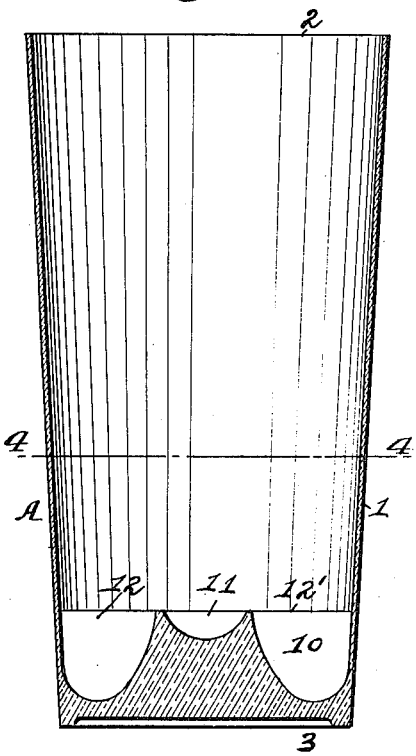
Figure 2:
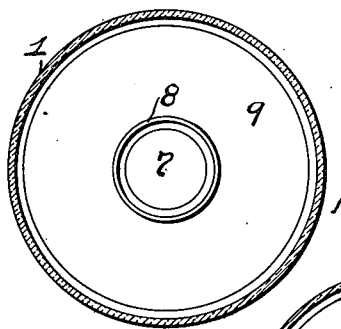
Figure 4:
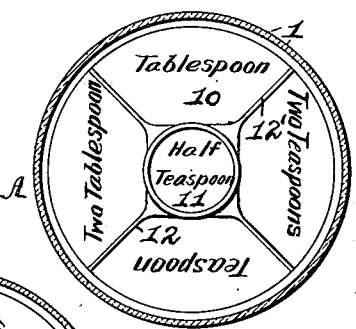
Figure 5:
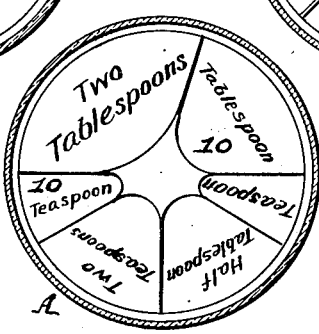

Figure 1 is a vertical section of a vessel or glass embodying my invention; Fig. 2 is a cross-section taken on the line 2—2 of Fig. 1, and looking in the direction of the arrow; Fig. 3 is a vertical section of a vessel or glass showing the same provided with a number of compartments therein; Fig. 4 is a cross-section taken on the line 4—4 Fig. 3 and looking in the direction of the arrow; and Fig. 5 is a plan view of another form of the vessel or glass.

Like symbols of reference herein indicate like parts in each of the figures of the drawings.

As illustrated in Figs. 1 and 2 of the drawing the vessel or glass A can be formed of any material, such as the ordinary clear glass or metal, and has its body 1 of the usual or general hollow cylindrical shape or contour, and provided with the top or mouth 2 and the bottom 3, while such body can also, if desired, have its sides tapered inwardly toward such bottom in the usual manner. The bottom 3 is extended upwardly and inwardly into the vessel or glass A as at 4, which forms the hollow portion 5 exteriorly and centrally of the bottom and the raised portion 6 centrally within the vessel or glass. This raised portion 6 has the cup or receptacle 7 formed thereon, and it extends upwardly from said portion within the vessel or glass A, so that it is provided with the top or mouth 8 at its upper end and below the top or mouth 2 of the vessel or glass, and its bottom is formed by the bottom 3 of such vessel or glass in forming said portion. The raised portion 6 and cup or receptacle 7 can also form with the body 1 and bottom 3 another receptacle 9 within the vessel or glass A surrounding said portion and cup.

The vessel or glass above described can be used for mixed drinks such as high balls, toddies, etc., wherein the liquor can be poured into the cup 7 and the water or other liquid around the same, while the receptacle 9 around said cup will allow for the ice generally used or other material forming the mixture desired. In such form the vessel or glass will offer a more attractive method of serving the drink, will enable uniform proportions, will eliminate the necessity for extra glassware generally required for such drinks, and will provide a convenient and economical device over the device generally employed in making and handling such drinks.

As shown in Figs. 3 and 4, the bottom 3 of the vessel or glass A is formed to provide for a series of compartments 10 around said bottom and within said vessel or glass. These compartments are formed around a central compartment 11 in the bottom 3 and are separated from each other by the partitions 12 between the same extending from the sides of the body 1 to the compartment 11, so that such sides and partitions and such bottom form the bottoms and sides of said compartments 10, and compartment 11 is formed entirely by and within said bottom 3. The tops or mouths 12 of such compartments 10 and 11 are below the mouth 2 of the vessel or glass A and each of such compartments are regulated by depth for capacity, while, if desired, such as in Fig. 6, the compartment 11 can be dispensed with and the compartments 10 arranged for their capacity by their width and depth.

The two forms of vessel or glass just described can be used for medicines, which will do away with the use of the spoon or other independent measuring devices, and can be used in the place of the ordinary drinking glass when forming part of the usual bath room or medicine chest supplies, and when used for medicines the vessel or glass will enable its uneven surface in forming the compartments to act as a self measure and mixer when water is poured into the vessel or glass. The measures or amounts denoting the capacity for each compartment can be blown, printed, etched or stamped on the sides of the vessel or glass opposite each compartment or upon the bottoms of the same, as desired, and various other modifications and changes in the design, ornamentation and configuration of my improved vessel or glass may be resorted to without departing from the spirit of the invention or sacrificing any of its advantages.

It will be obvious that in the use of my improved vessel or glass for drinking purposes, the tilting of the same in the act of drinking will cause all the contents of the compartment or compartments to mix with each other or with the water or other liquid placed in the vessel or glass, so that they will be thoroughly mixed while drinking the same.

What I claim as my invention and desire to secure by Letters Patent is:

1. A drinking vessel having separated receptacles formed in the bottom of the same and having their mouths below the mouth of the vessel.

2. A drinking vessel having a substantially circular separated receptacle formed in the bottom of the same and having its mouth below the mouth of the vessel.

3. A drinking vessel having a substantially circular separated receptacle formed in a raised portion on the bottom of the same and having its mouth below the mouth of the vessel.

In testimony whereof, I the said MAX NIRDLINGER have hereunto set my hand.

MAX NIRDLINGER.

Witnesses:
JOSEPHINE MACGILVRAY,
J. N. COOKE.